(12) United States Patent
Spencer

(10) Patent No.: US 7,646,701 B2
(45) Date of Patent: Jan. 12, 2010

(54) INCREMENTAL REDUNDANCY USING HIGH-ORDER MODULATION AND CODING SCHEMES

(75) Inventor: Paul Spencer, Modiin (IL)

(73) Assignee: Intel Corporation, Santa Clara, CA (US)

( * ) Notice: Subject to any disclaimer, the term of this patent is extended or adjusted under 35 U.S.C. 154(b) by 466 days.

(21) Appl. No.: 11/425,373

(22) Filed: Jun. 20, 2006

(65) Prior Publication Data

US 2008/0002565 A1  Jan. 3, 2008

(51) Int. Cl.
H04L 1/00 (2006.01)
(52) U.S. Cl. .................. 370/204; 370/206; 370/216; 714/749; 714/758; 714/790
(58) Field of Classification Search .................. 370/204
See application file for complete search history.

(56) References Cited

U.S. PATENT DOCUMENTS

| 2001/0034872 | A1* | 10/2001 | Smallcomb | ............... 714/786 |
| 2003/0088822 | A1* | 5/2003 | Kim et al. | ................... 714/790 |
| 2005/0197065 | A1* | 9/2005 | Tamaki et al. | ................ 455/42 |

OTHER PUBLICATIONS

"Agilent Incremental Redundancy in EGPRSE", *Application Note—5989-1156EN*, http://cp.literature.agilent.com/litweb/pdf/5989-1156EN.pdf,(2004), 16 pgs.
"GERAN Evolution—New Performance Data for Turbo Coding and Higher Order Modulation Schemes", *3GPP TSG GERAN #29, Tdoc GP-060931*, San Jose del Cabo, Mexico, Apr. 24-28, 2006; Source: Intel Corporation,(2006), 18 pgs.
"GERAN Evolution—New Proposed Text on New Coding Schemes for Technical Report", *3GPP TSG GERAN #27, Tdoc GP-052722*, Atlanta, GA, Nov. 7-11, 2005, Source: Intel Corporation,(2005), 33 pgs.
"More Results on 16QAM and Turbo Codes", *3GPP TSG GERAN #29, Tdoc GP-060784*, San Jose del Cabo, Mexico, Source: Ericsson,(2006), 9 pgs.
"Multiplexing and Channel Coding (FDD) (Release 7)", *3GPP TS 25.212 v7.0.0* (Mar. 2006), (Technical Specification),(2006), 84 pgs.
"Overall Description of the GPRS Radio Interface, Stage 2 (Release 7)", *3GPP TS 43.064 V7.1.0* (Jun. 2006), (Technical Specification),(2006),68 pgs.

(Continued)

*Primary Examiner*—Chi H. Pham
*Assistant Examiner*—Shick Hom
(74) *Attorney, Agent, or Firm*—Schwegman, Lundberg & Woessner, P.A.

(57) ABSTRACT

Apparatus and systems comprise a forward error correction (FEC) encoder to encode a data block to produce an encoded data block in a radio link control media access control (RLC-MAC) module. The EFC encoder may be coupled to a punctured subset selector to select a punctured subset of the encoded data block for transmission across a communication link. The punctured subset selector may be coupled to a modulator to modulate the punctured subset of the encoded data block using a selectable modulation type selected by a modulation selector coupled to the modulator. Hybrid automatic repeat request (HARQ) logic may be coupled to the modulation selector to receive at least one of an acknowledgement (ACK) or a no-acknowledgement (NACK) that a previously-transmitted punctured subset of the encoded data block was successfully decoded at a receiving end of the communication link. Additional apparatus, systems, and methods are disclosed.

17 Claims, 4 Drawing Sheets

OTHER PUBLICATIONS

"Performance of 16-QAM and Turbo Codes With Mobile Station Receive Diversity", *3GPP TSG GERAN #29, GP-060773*, San Jose del Cabo, Mexico, Apr. 24-28, 2006, Source: Nokia,(2006),5 pgs.

"Two Burst Based Link Quality Control Proposal for EGPRS", *ETSI SMG2 WPA/WPB Meeting*, (TDoc SMG2 WPA 127/99, WPB 003/99, Source: AT&T, Ericsson, Lucent, Lucent, Nokia, Nortel,(1999), 9 pgs.

"Xilinx® IEEE802.16 WirelessMAN Solutions", http://www.xilinx.com/esp/wireless/collateral/wirelessMAN_esp.pdf, (archived on Oct. 12, 2004), 1-65.

Berrou, C., et al., "Near Shannon Limit Error-Correcting Coding and Decoding: Turbo-Codes. 1", *Technical Program, Conference Record, IEEE International Conference on Communications* (ICC '93), vol. 2, (May 1993), 1064-1070.

Eliaspur, Y., et al., "Normal MAP Extension for MIMO H-ARQ", *IEEE 802.16 Broadband Wireless Access Working Group*, (Jan. 12, 2005),1-8.

Yin, H., "Wireless Adaptive Packet Control Message Apparatus, Systems, and Methods", U.S. Appl. No. 11/459,100, filed Jul. 21, 2006.

* cited by examiner

INCREMENTAL REDUNDANCY USING HIGH-ORDER MODULATION AND CODING SCHEMES

TECHNICAL FIELD

Various embodiments described herein relate to digital communications generally, including apparatus, systems, and methods used in wireless communications.

BACKGROUND INFORMATION

An evolving family of standards, specifications, and technical reports is being developed by the Third Generation Partnership Project (3GPP™) to define parameters associated with second and third generation wireless communication systems. These systems include a Global System for Mobile communication (GSM) and data access technologies such as General Packet Radio Service (GPRS), enhanced GPRS (EG-PRS), and Enhanced Data rates for GSM Evolution (EDGE). The acronyms GSM, GPRS, EGPRS, and EDGE are subsumed in "GSM EDGE radio access network (GERAN)." Additional information regarding these technologies may be found in European Telecommunications Standards Institute (ETSI) Technical Specification TS 101 855 V8.17.0, Digital Cellular Telecommunications System (Phase 2+); Technical Specifications and Technical Reports for a GERMAN-based 3GPP™ System (3GPP™) TS 01.01 version 8.17.0 Release 1999) (published June 2005). Additional information regarding the 3GPP™ may be found at its website.

Current GERAN standardizations may use modulation and forward error correction (FEC) coding schemes (MCSs) that include a one-third rate convolution coding operation followed by puncturing to a desired code rate. A resulting punctured block may be modulated according to one of several modulation types and interleaved across several time-division multiple-access (TDMA) frames. These MCSs may be denoted MCSI thru MCS9. For example, MCS7, MCS8 and MCS9 may operate using coding rates of R=0.75, 0.82, and 1.0, respectively, and may be encoded and modulated to provide data rates of approximately 45.0 to 59.4 kilobits (kbits)/s per timeslot A particular MCS may be selected, depending on prevailing signal conditions, to transmit one or more radio link control (RLC) packet data units (PDUs) segmented from a logical link control (LLC) layer. For example, an MCS6radio block may utilize two 37-octet radio bursts to transmit a 74-octet RLC PDU utilizing 8-PSK modulation. An MCS3 radio block, on the other hand, may utilize a single 37-octet radio burst to transmit a 37-octet RLC PDU utilizing GMSK modulation.

A success or failure of decoding the RLC PDU may be sensed at a receiving end of a link and reported to a transmitting end of the link via acknowledge (ACK) or no-acknowledge (NACK) signaling, respectively. If a NACK is received at the transmitting end of the link, the transmission may be repeated utilizing a mechanism referred to as "automatic repeat request" (ARQ). Successive retransmissions may utilize successively more robust MCS levels to increase a likelihood of a successful decode.

Alternatively, encoded bits associated with an RLC PDU and received from a first transmission may be supplemented with a set of additional encoded bits associated with the same RLC PDU sent via a second transmission. An FEC decoder at the receiving end of the communication link may utilize sets of encoded bits from successive transmissions to enhance a decoding probability until a successful decode is obtained. The latter mechanism may be referred to as "hybrid ARQ" (HARQ).

One implementation of HARQ, referred to as "Type II incremental redundancy," may select each set of additional encoded bits for successive transmissions using a different puncturing scheme for each. This technique may effectively increase a code rate. An information block of N information bits, $[S_0 S_1 \ldots S_{10\text{-}1}]$, may be encoded as $[s_0 p_{00} p_{01} s_1 p_{10} p_{11} \ldots s_{N\text{-}1} p_{(N\text{-}3)0} p_{(N\text{-}3)1}]$, where $p_{k0}$ and $p_{k1}$ are parity bits output with a kth systematic bit. Using a simplified example, assume that N=16 without loss of generality, and that any code tail bits are neglected. Until the codeword is correctly decoded, transmission redundancy versions might follow a pattern similar to the following:

Transmission 1: $[S_0 S_1 \ldots S_{15}]$
Transmission 2: $[P_{00} P_{11} P_{20} P_{33} \ldots P_{14,0} P_{15,1}]$
Transmission 3: $[P_{00} P_{10} P_{23} P_{30} \ldots P_{14,1} P_{15,0}]$ On the first transmission, N systematic bits may be sent. If the block is not received correctly, Transmission 2 may be sent using a punctured version of N of the parity bits. This may be combined at the receiver for an additional attempt to decode. If the block is again received incorrectly, Transmission 3 may be sent using another redundancy version of the parity bits. At this point all bits may have been transmitted at least once. A further attempt at decoding may be made. Should the further attempt fail, the redundancy version sequence may be repeated until the block is correctly decoded. Following each transmission, newly-received bits may be combined with those received in previous punctured versions of the block. This may increase an initial data input to the FEC decoder.

Successively-transmitted differently-punctured sets of encoded bits may be sent with successively more robust MCS levels. However, the latter technique may be incompatible between certain MCS levels. Consider, for example, a 74-octet RLC PDU formatted into a 74-octet MCS6 radio block and sent as a first transmission. If the first transmission is not successfully decoded, it may be desirable to re-segment the 74-octet RLC PDU as two 37-octet RLC PDUs for retransmission using MCS3. Since the RLC PDU sizes are different, the data may be re-encoded for the retransmission. The resulting set of encoded bits may be compatible with the set of encoded bits received as the first transmission, for purposes of an FEC decoding operation. It may thus be necessary to discard the set of encoded bits received as the first transmission.

Additional information regarding EGPRS block lengths may be found in 3GPP™ TS 43.064 V6.5.0 (2004-11) Technical Specification 3rd Generation Partnership Project Technical Specification Group GSM/EDGE Radio Access Network; General Packet Radio Service (GPRS); Overall description of the GPRS Radio Interface; Stage 2 (Release 6) (published November 2004).

DETAILED DESCRIPTION

Figure 1:
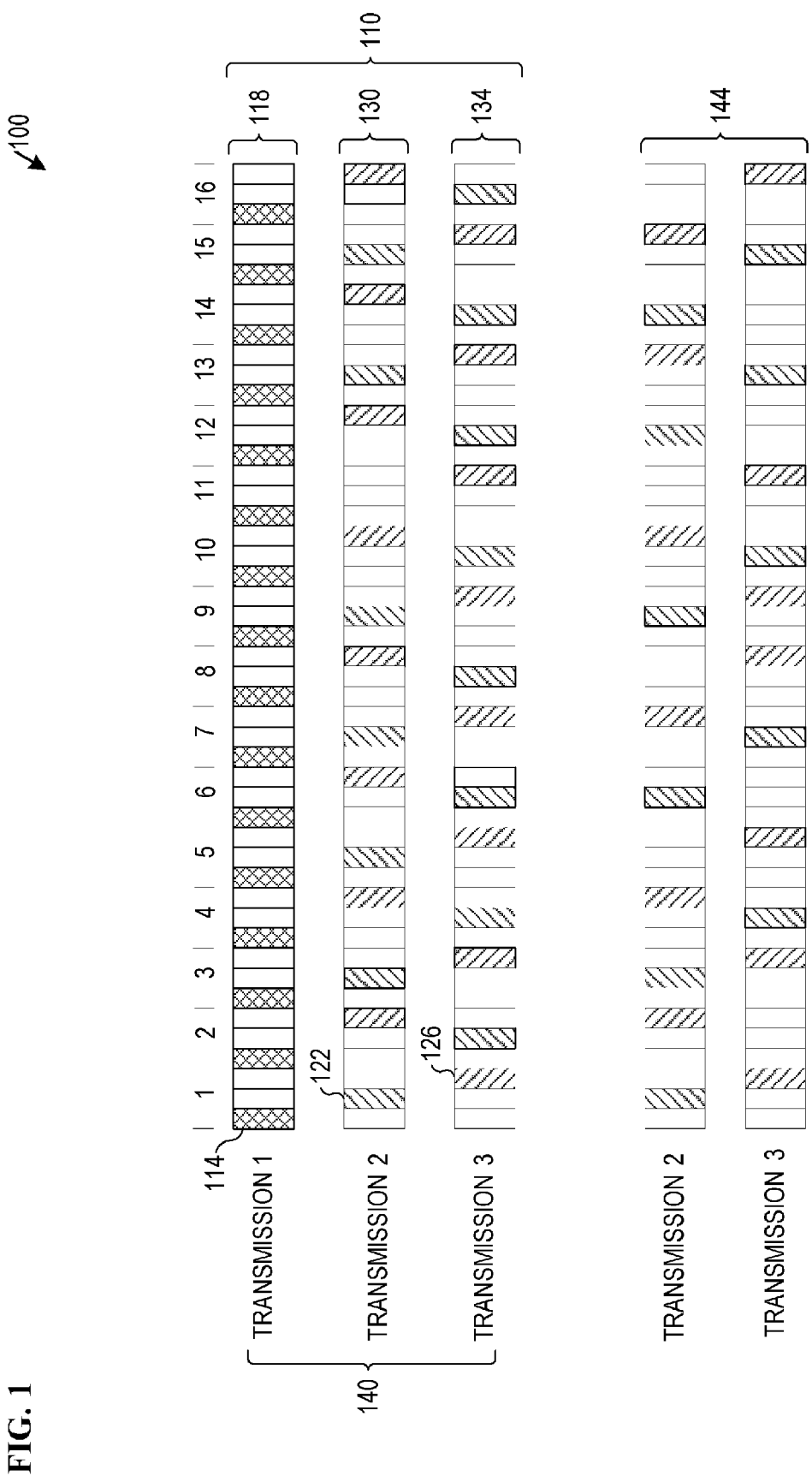
FIG. 1 is a simplified example GERAN system bit puncturing map according to various embodiments.

FIG. 1 is a simplified example GERAN system bit puncturing map 100 according to various embodiments. Embodiments herein may enhance system throughput by enabling incremental redundancy with intra-block modulation changes.

Map blocks 110 depict a simplified example of a 16-bit RLC PDU, FEC encoded at a one-third rate to form a codeword. Bits represented by a first crosshatch 114 may comprise information bits. In this example, the information bits may be transmitted as a first punctured subset 118 of the codeword in a first transmitted radio block. Bits represented by a second crosshatch 122 may comprise first parity bits. In this example, the first parity bits may be located at a first offset from the information bits. Bits represented by a third crosshatch 126 may comprise second parity bits. In this example, the second parity bits may be located at a second offset from the information bits.

A second punctured subset 130 of the codeword may comprise a first combination of the first and second parity bits. The second punctured subset 130 may be transmitted in a second radio block if the first transmitted radio block fails to decode at a receiving end of a communication link. A third punctured subset 134 of the codeword may comprise a second combination of the first and second parity bits. The third punctured subset 134 may be transmitted in a third radio block if the second radio block fails to decode.

The simplified FEC encoding, puncturing, and incremental redundancy schemes depicted in the preceding example, in FIG. 1, and in foregoing examples are merely examples set forth for purposes of illustration, without loss of generality. As those skilled in the art will appreciate, other coding, puncturing, and incremental redundancy schemes are possible.

Some embodiments described herein may change a modulation density between one or more transmissions 140. Modulation density, as described herein, means a number of encoded bits transmitted per modulation symbol. Some embodiments herein may decrease the modulation density between one or more the transmissions 140. Other embodiments may increase the modulation density between one or more of the transmission 140.

If the modulation density is decreased between one or more of the transmissions 140, available timeslots may be filled with less than all bits of an associated punctured subset (e.g., of the subset 130 or the subset 134). Some embodiments may fit selected bits of the associated punctured subset into the available timeslots, as depicted in map blocks 144. Various bit-selection techniques may discard excess bits in an effort to minimize an impact on effort to minimize an effective code length.

Figure 2:
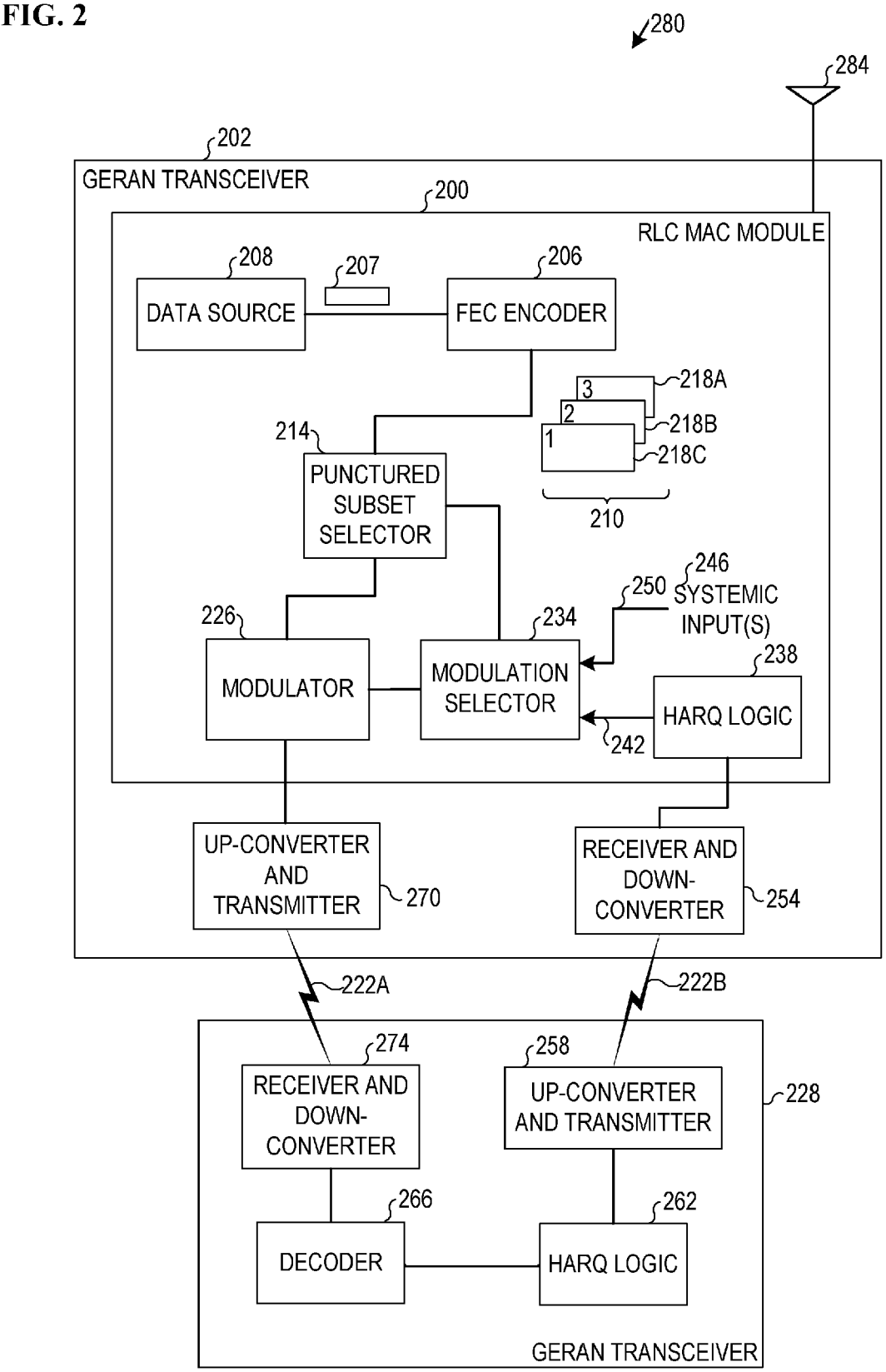
FIG. 2 is a block diagram of an apparatus and a representative system according to various embodiments.

FIG. 2 is a block diagram of an apparatus 200 and a representative system 280 according to various embodiments. The apparatus 200 may comprise an RLC MAC module associated with a first GERAN transceiver 202. The apparatus 200 may also include an FEC encoder 206. The FEC encoder 206 may encode a data block 207 from a date source 208 to produce an encoded data block 210.

A punctured subset selector 214 may be coupled to the FEC encoder 206. The punctured subset selector 214 may select a punctured subset 218A, 218B, or 218C of the encoded data block 210. The punctured subset 218A, 218B, or 218C may be selected for transmission across a communication link 222A.

A modulator 226 may be coupled to the punctured subset selector 214. The modulator 226 may modulate the punctured subset of the encoded data block 210 using a selected modulation type. The modulation type may be selected according to whether a previously-transmitted punctured subset of the encoded data block 210 was successfully decoded at a receiving end of the communication link 222A. The receiving end of the communication link 222A may be associated with a second GERAN transceiver 228. The modulation type may also be selected based upon a set of systemic operational parameters. The systemic operational parameters may include a bit error rate associated with packet transfer across the communication link 222A and/or across a communication link 222B. The systemic operation parameters may also include a received signal strength, an estimated carrier to interference ration, and/or a bit error probability associated with an uplink, a downlink, or both. Other systemic operational parameters may be used to determine the modulation type.

A modulation selector 234 may be coupled to the modulator 226. The modulation selector 234 may cause the modulator 226 to begin transmitting subsequent punctured subsets of the encoded data block 210 using a modulation type different from that used to transmit punctured subsets of the encoded data block 210 previously. The modulation selector 234 may also select the subsequent modulation type.

First HARQ logic 238 may be coupled to the modulation selector 234. The first HARQ logic 238 may receive an ACK or a NACK indicating whether the previously-transmitted punctured subset of the encoded data block 210 was successfully decoded at the receiving end of the communication link 222A. The first HARQ logic 238 may thus comprise a first input 242 to the modulation selector 234. Systemic inputs 246 may comprise a second input 250 to the modulation selector 234. In some embodiments, the first input 242 may indicate that a modulation type change should be made. The second input 250 may comprise criteria to determine the modulation type to change to or to assist the modulation selector 234 in determining the modulation type to change to using the systemic operational parameters, as previously described. Other combinations of inputs to the modulation selector 234 may be possible.

The apparatus 200 may also include a first receiver and down-converter 254 coupled to the first HARQ logic 238. The first receiver and down-converter 254 may communicate with a first up-converter and transmitter 258 at a receiving end of the communication link 222B. The first receiver and down-converter 254 may receive the ACK or the NACK. The ACK, the NACK, or both may be originated by second HARQ logic 262 at the receiving end of the communication link 222B. The ACK or the NACK may be based upon an indication from a decoder 266 coupled to the second HARQ logic 262 of a decoding success or a decoding failure, respectively.

The apparatus 200 may further include a second up-converter and transmitter 270 coupled to the modulator 226. The second up-converter and transmitter 270 coupled to eh modulator 226. The second up-converter and transmitter 270 may communicate with a second receiver and down-converter 274 at the receiving end of the communication link 222A.

In another embodiment, a wireless system 280 may include one or more of the apparatus 200 as previously described. The apparatus 200 may be operatively coupled to an antenna 284 to transmit a punctured subset of an encoded data block. The antenna 284 may comprise a patch antenna, an omnidirectional antenna, a beam antenna, a slot antenna, a monopole antenna, or a dipole antenna, among other types.

Any of the components previously described can be implemented in a number of ways, including embodiments in software. Thus, the GERAN system bit puncturing map 100, the map blocks 110, 144; the crosshatches 114, 122, 125; the punctured subsets 118, 130, 134; the transmissions 140, the apparatus 200; the GERAN transceivers 202, 228; the FEC encoder 206; the data flocks 207, 210; the data source 208; the punctured subset selector 214; the punctured subsets 218A, 218B, 218C; the communication link 222A, 222B; the modulator 226; the modulation selector 234; the HARQ logic 238, 262; the inputs 242, 246 250; the receiver and down-converters 254, 274; the up-converter and transmitters 258, 270; the decoder 266; the wireless system 280; and the antenna 284 may all be characterized as "modules" herein.

The modules may include hardware circuitry, single or multi-processor circuits, memory circuits, software program modules and objects, firmware, and combinations thereof, as desired by the architect of the apparatus 200 and the system 280 and as appropriate for particular implementations of various embodiments.

The apparatus and systems of various embodiments may be useful in applications other than enabling incremental redundancy with intra-block modulation changes to increase system throughput. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single of multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, table computers, etc.), workstations, radios, video players, audio players (e.g., mp3 players), vehicles, medical devices (e.g., heart monitor, blood pressure monitor, etc.) and others. Some embodiments may include a number of methods.

Figure 3:
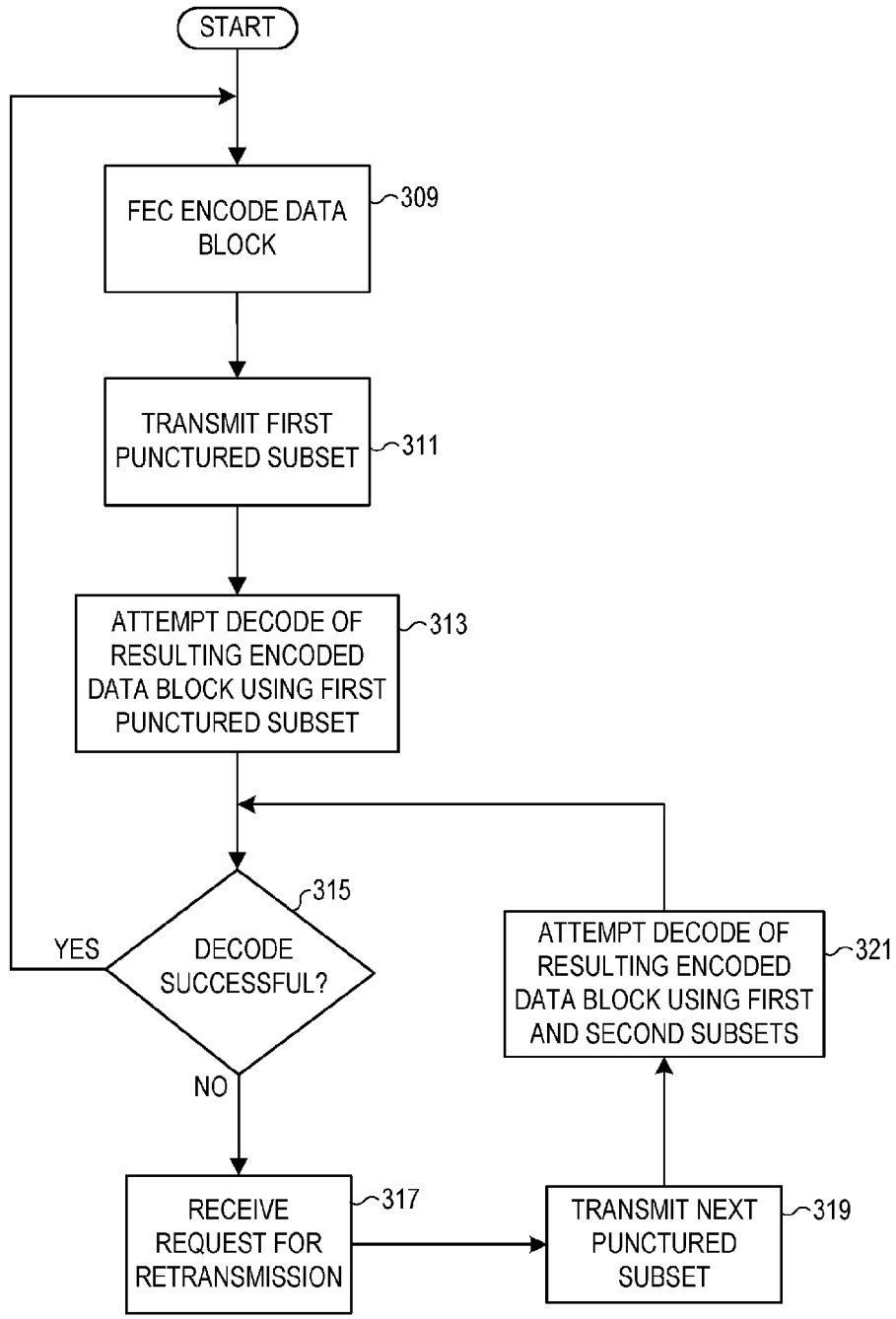
FIG. 3 is a flow diagram illustrating several methods according to various embodiments.

FIG. 3 is a flow diagram illustrating several methods according to various embodiments. A method 300 may commence at block 309 with encoding a data block with an FEC code for transmission across a wireless communication link in a GERAN. The data block may comprise an RLC PDU. In some embodiments, a single RLC PDU may be associated with each radio block. The FEC code may comprise a turbo code, among other types.

The method 300 may continue with transmitting a first punctured subset of a resulting encoded data block using a first modulation type, at block 311. The method 300 may also include attempting a decode of the resulting encoded data block using the first punctured subset, at block 313. The method 300 may test whether the first punctured subset was successfully decoded, at block 315. An acknowledgement may be received at a transmitting end of the communication link from the receiving end of the communication link to indicate that the first punctured subset was successfully decoded. In the case of a successful decode, the method 300 may return to block 309 to encode another data block.

If the first punctured subset was not successfully decoded upon receipt at the receiving end of the communication link, the method 300 may continue at block 317 with receiving a request for retransmission at a transmitting end of the communication link. A request for retransmission may also be received at the transmitting end of the communication link if a radio block is received out of sequence at a receiving end of the communication link according to a block sequence number.

If the first punctured subset of the resulting encoded data block is not successfully decoded at the receiving end of the communications link, the method 300 may further include transmitting a second punctured subset of the resulting encoded data block using a second modulation type, at block 319. In some embodiments, a first modulation density associated with the first modulation type may be higher than a second modulation density associated with the second modulation type. This technique may increase a probability of a successful decode by transmitting successive punctured subsets with a more robust modulation type.

The first modulation type, the second modulation type, or both, may be associated with a gaussian minimum shift keyed (GMSK) modulation technique, an eight-state phase-shift keyed (8-PSK) modulation technique, a sixteen-state amplitude phase-keyed (16-APK) modulation technique, a sixteen-state quadrature amplitude modulation technique (16-QAM), a sixteen-state phase-shift keyed modulation technique (16-PSK), a sixteen-state pulse amplitude modulation technique (16-PAM), a 32-state modulation technique, and a 64-state modulation technique, among others.

The receiving end of the communication link may utilize the first punctured subset, the second punctured subset, or both, in an attempt to decode the resulting encoded data block; at block 321. The method 300 may continue at block 315 with determining whether the decode operation is successful. Success may be indicated by a receipt of an acknowledgement from the receiving end of the communication link, as previously described.

It is noted that the term "second punctured subset" is generalized to mean punctured subsets of the resulting encoded data block that are transmitted successively following transmission of the first punctured subset, if the first punctured subset is not successfully decoded. The second punctured subset may thus comprise successive punctured subsets made up of difference bit combinations than those of the first punctured subset. The second punctured subset may also comprise the same bit combination as the first punctured subset, however. This may occur, for example if three punctured subsets of the resulting encoded data block encoded with a one-third FEC code are transmitted without a successful decode. Retransmission may resume by repeating the transmission of the first punctured subset. Thus, the term "second punctured subset" is generalized to include subsets of the resulting encoded data block resulting from any single puncturing technique or any combination of puncturing techniques, transmitted according to any incremental redundancy scheme, without limitation.

The first punctured subset, the second punctured subset, or both may be transmitted in a radio block, in some cases using a HARQ protocol. The second punctured subset may comprise a reduced subset of punctured bits selected from bits of the resulting encoded data block. The subset may be reduced if the second subset is transmitted using a modulation type of a lower modulation type may be capable of fewer bits per symbol, a complete punctured subset of bits may not fit into available timeslots associated with a GERAN subscriber channel.

Although the above examples are described in connection with GERAN, the methods and apparatus described herein are readily applicable to other wireless communication networks operating in accordance with other suitable wireless communication standards and/or protocols.

It may be possible to execute the activities described herein in an order other than the order described. And, various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 4 below.

Figure 4:
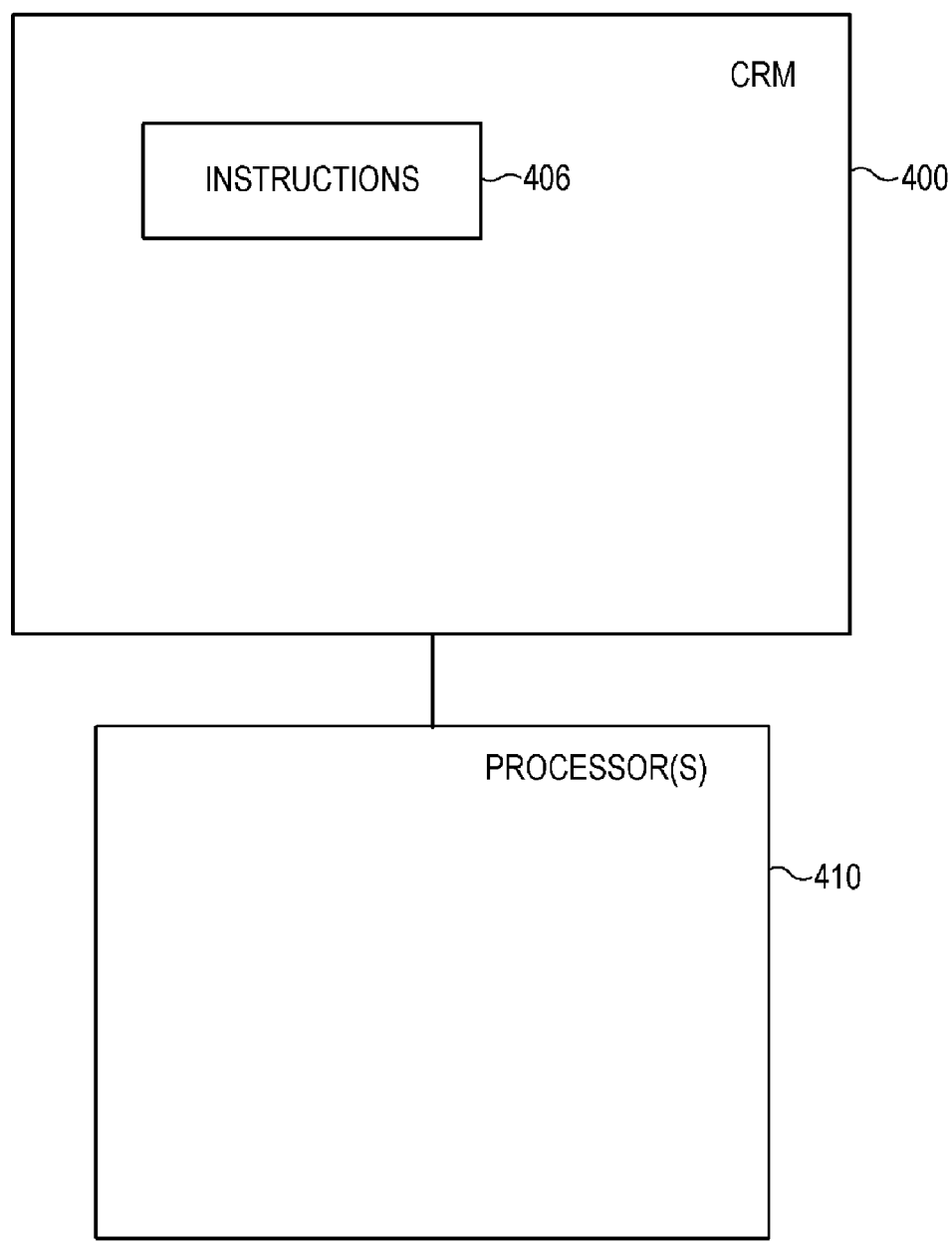
FIG. 4 is a block diagram of a computer-readable medium according to various embodiments.

FIG. 4 is a block diagram of a computer readable medium (CRM) 400 according to various embodiments of the invention. Examples of such embodiments may comprise a memory system, a magnetic or optical disk, or some other storage device. The CRM 400 may contain instructions 406 which, when accessed, result in one or more processors 410 performing any of the activities previously described, including those discussed with respect to the method 300 noted above.

Implementing the apparatus, systems, and methods disclosed herein may enable intra-block modulation type changes during incremental redundancy operation in a GERAN. Incremental decoding using previously-received punctured subsets of an encoded RLC PDU may continue after the modulation type change. Overall system throughput may be increased as a result.

Although the inventive concept may include embodiments described in the exemplary context of a 3GPP™ GERAN standard implementation or an IEEE standard 802.xx implementation (e.g., 802.11, 802.11a, 802.11b, 802.11e, 802.11g, 802.16, 802.16e, etc.), the claims are not so limited. Additional information regarding the IEEE 802.11 standard may be found in "ANSI/IEEE Std. 802.11, Information technology—Telecommunications and information exchange between systems—Local and metropolitan area networks—Specific requirements—Part 11: Wireless LAN Medium Access Control (MAC) and Physical Layer (PHY) Specifications" (published 1999; reaffirmed June 2003). Additional information regarding the IEEE 802.11a protocol standard technology—Telecommunications and information exchange between systems—Local and metropolitan area networks—Specific requirements Part 11: Wireless LAN Medium Access Control (MAC) and Physical Layer (PHY) specifications—High-speed Physical Layer in the 5 GHz Band (published 1999); reaffirmed Jun. 12, 2003). Additional information regarding the IEEE 802.11b protocol standard may be found in IEEE Std 802.11b, Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band (approved Sep. 16, 1999, reaffirmed Jun. 12, 2003). Additional information regarding the IEEE 802.11e standard may be found in "IEEE 802.11e Standard for Information technology—Telecommunications and information exchange between systems—Local and metropolitan area networks—Specific requirements Pat 11: Wireless LAN Medium Access Control (MAC) and Physical layer (PHY) specifications: Amendment 8: Medium Access Control (MAC) Quality of Service Enhancements (published 2005). Additional information regarding the IEEE 802.11g protocol standard may be found in IEEE Std 802.11g™, IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band (approved Jun. 12, 2003). Additional information regarding the IEEE 802.16 standard may be found in IEEE Standard for Local and Metropolitan Area Networks—Part 16: Air Interface for Fixed Broadband Wireless Access Systems (published Oct. 1, 2004). See also IEEE 802.16E-2005, IEEE Standard for Local and Metropolitan Area Networks—Part 16: Air Interface for Fixed and Mobile Broadband Wireless Access Systems—Amendment for Physical and Medium Access Control Layers for Combined Fixed and Mobile Operation in Licensed Bands (published Feb. 28, 2006). Further, the Worldwide Interoperability for Microwave Access (WiMAX) Forum facilitates the deployment of broadband wireless networks based on the IEEE 802.16 standards. Additional information regarding the IEEE 802.16e™ protocol standard may be found in 802.16e ™: IEEE Standard for Local and Metropolitan Area Networks—Part 16: Air Interface for Fixed and Mobile Broadband Wireless Access Systems—Amendment 2: Physical and Medium Access Control Layers for Combined Fixed and Mobile Operation in Licensed Bands (published Feb. 28, 2006).

Embodiments of the present invention may be implemented as part of any wire or wireless system. Examples may also include embodiments comprising multi-carrier wireless communication channels (e.g., orthogonal frequency division multiplexing (OFDM), discrete multitone (DMT), etc.) such as may be used within a wireless personal are network (WPAN), a wireless local are network (WLAN), a wireless metropolitan are network (WMAN), a wireless wide area network (WWAN), a cellular network, a third generation (3G) network, a fourth generation (4G) network, a universal mobile telephone system (UMTS), and like communication systems, without limitation.

The accompanying drawings that form a part hereof show, by way of illustration and not of limitation, specific embodiments in which the subject matter may be practiced. The embodiments illustrated are described insufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments show. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus, including:
   a forward error correction (FEC) encoder to encode a data block to produce an encoded data block in a radio link control media access control (RLC-MAC) module associated with a global system for mobile communications (GSM) enhanced data rates for GSM evolution (EDGE) radio access network (GERAN);
   a punctured subset selector coupled to the FEC encoder to select a punctured subset of the encoded data block for transmission across a communication link;
   a modulator coupled to the punctured subset selector to modulate the punctured subset of the encoded data block using a selectable modulation type;
   a modulation selector coupled to the modulator to select the modulation type; and
   first hybrid automatic repeat request (HARQ) logic coupled to the modulation selector to receive at least one of an acknowledgement (ACK) or a no-acknowledgement (NACK) that a previously-transmitted punctured subset of the encoded data block was successfully decoded at a receiving end of the communication link.

2. The apparatus of claim 1, further including:
   an up-converter and transmitter coupled to the modulator to communicate with a receiver and down-converter at the receiving end of the communication link.

3. The apparatus of claim 1, further including:
   a receiver and down-converter coupled to the first HARQ logic to communicate with an up-converter and transmitter at the receiving end of the communication link and to receive the at least one of the ACK or NACK, wherein the at least one of the ACK or NACK is originated by second HARQ logic at the receiving end of the communication link and is based upon an indication from a decoder coupled to the second HARQ logic of at least one of a decoding success or a decoding failure.

4. A system, including:
   a forward error correction (FEC) encoder to encode a data block to produce an encoded data block in a radio link control media access control (RLC-MAC) module associated with a global system for mobile communications (GSM) enhanced data rates for GSM evolution (EDGE) radio access network (GERAN);
   a punctured subset selector coupled to the FEC encoder to select a punctured subset of the encoded data block for transmission across a communication link;
   a modulator coupled to the punctured subset selector to modulate the punctured subset of the encoded data block using a selectable modulation type;
   a modulation selector coupled to the modulator to select the modulation type;
   hybrid automatic repeat request (HARQ) logic coupled to the modulation selector to receive at least one of an acknowledgement (ACK) or a no-acknowledgement (NACK) that a previously-transmitted punctured subset of the encoded data block was successfully decoded at a receiving end of the communication link; and
   an onmidirectional antenna coupled to the RLC-MAC module to transmit the punctured subset of the encoded data block.

5. A method, including:
   encoding a data block with a forward error correction (FEC) code for transmission across a wireless communication link in a global system for mobile communications (GSM) enhanced data rates for GSM evolution (EDGE) radio access network (GERAN);
   transmitting a first punctured subset of a resulting encoded data block using a first modulation type;
   transmitting a second punctured subset of the resulting encoded data block using a second modulation type if the first punctured subset of the resulting encoded data block is not successfully decoded at a receiving end of the communication link; and
   receiving an acknowledgement at a transmitting end of the communication link when the receiving end of the communication link successfully decodes the resulting encoded data block using at least one of the first punctured subset of the resulting encoded data block or the second punctured subset of the resulting encoded data block.

6. The method of claim 5, wherein the data block comprises a radio link control (RLC) packet data unit (PDU).

7. The method of claim 5, wherein a single radio link control (RLC) packet data unit (PDU) is associated with each radio block.

8. The method of claim 5, wherein the FEC code comprises a turbo code.

9. The method of claim 5, further including:
   receiving a request for retransmission at a transmitting end of the communication link if at least one of the first punctured subset of the resulting encoded data block or the second punctured subset of the resulting encoded data block is not correctly decoded upon receipt at the receiving end of the communication link.

10. The method of claim 5, further including:
    receiving a request for retransmission at a transmitting end of the communication link if a radio block is received out of sequence at the receiving end of the communication link according to a block sequence number.

11. The method of claim 5, wherein at least one of the first modulation type or the second modulation type is associated with at least one of a gaussian minimum shift keyed (GMSK) modulation technique, an eight-state phase-shift keyed (8-PSK) modulation technique, a sixteen-state amplitude phase-keyed (16-APK) modulation technique, a sixteen-state quadrature amplitude modulation technique (16-QAM), a sixteen-state phase-shift keyed modulation technique (16-PSK), a sixteen-state pulse amplitude modulation technique (16-PAM), a 32-state modulation technique, or a 64-state modulation technique.

12. The method of claim 5, wherein a first modulation density associated with the first modulation type is higher than a second modulation density associated with the second modulation type.

13. The method of claim 5, wherein at least one of the first punctured subset of the resulting encoded data block or the second punctured subset of the resulting encoded data block is transmitted in a radio block.

14. The method of claim 5, wherein at least one of the first punctured subset of the resulting encoded data block or the second punctured subset of the resulting encoded data block is transmitted using a hybrid automatic repeat request (HARQ) protocol.

15. The method of claim 5, wherein the second punctured subset of the resulting encoded data block comprises a reduced subset of punctured bits selected from bits of the resulting encoded data block.

16. A computer-readable medium having instructions, wherein the instructions, when executed, result in at least one processor performing:
 encoding a data block with a forward error correction (FEC) code for transmission across a wireless communication link in a global system for mobile communications (GSM) enhanced data rates for GSM evolution (EDGE) radio access network (GERAN);
 transmitting a first punctured subset of a resulting encoded data block using a first modulation type;
 transmitting a second punctured subset of the resulting encoded data block using a second modulation type if the first punctured subset of the resulting encoded data block is not successfully decoded at a receiving end of the communication link; and
 receiving an acknowledgement at a transmitting end of the communication link when the receiving end of the communication link successfully decodes the resulting encoded data block using at least one of the first punctured subset of the resulting encoded data block or the second punctured subset of the resulting encoded data block.

17. The computer-readable medium of claim 16, wherein a single radio link control (RLC) block is associated with each radio block.

* * * * *

UNITED STATES PATENT AND TRADEMARK OFFICE
CERTIFICATE OF CORRECTION

PATENT NO. : 7,646,701 B2
APPLICATION NO. : 11/425373
DATED : January 12, 2010
INVENTOR(S) : Paul Spencer It is certified that error appears in the above-identified patent and that said Letters Patent is hereby corrected as shown below:

On the title page, item (57), under "Abstract", in column 2, line 4, delete "EFC" and insert -- FEC --, therefor.

In column 10, line 5, in Claim 4, delete "onmidirectional" and insert -- omnidirectional --, therefor.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,646,701 B2  Page 1 of 1
APPLICATION NO. : 11/425373
DATED : January 12, 2010
INVENTOR(S) : Paul Spencer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 672 days.

Signed and Sealed this

Twenty-eighth Day of December, 2010

David J. Kappos
*Director of the United States Patent and Trademark Office*